*March 12th 1872. Reissued*

121,665

UNITED STATES PATENT OFFICE.

E. DELMAR DE HAYS SAINT CYR, OF LOWELL, MASSACHUSETTS.

IMPROVEMENT IN MEDICAL COMPOUNDS OR COFFEE-ANTIDOTES.

Specification forming part of Letters Patent No. 121,665, dated December 5, 1871.

*To all whom it may concern:*

Be it known that I, Dr. E. DELMAR DE HAYS SAINT CYR, of Lowell, in the county of Middlesex and State of Massachusetts, have invented a certain new and useful Improved Medical Compound, which I denominate a "coffee-antidote;" and that the following is a full and exact description of the same.

This medical compound is both for a therapeutic and a preventive agent in cases of miasmatic poisonings, epidemic and putrid diseases, such as cholera, yellow fever, intermittent fever, the various typhoid malignant affections, hospital putrefaction, mortification, &c.

The compound is composed of the ingredients mixed together in or about the proportions as follows: Hyposulphite of soda, eighty (80) grains; chloride of sodium, eighty (80) grains; nitrate of potassa, forty (40) grains; carbolic acid, (extra pure,) eight (8) grains; compound tincture of iodide of sulphur, (produced as will be hereinafter stated,) eighty (80) minims; glycerine, (by preference Price's, so known,) one (1) ounce; sirup of coffee, seven (7) ounces.

The compound of tincture of iodide of sulphur used as above is produced as and in the manner substantially as follows: Pulverized iodine, one (1) ounce; iodide of potassium, two (2) ounces; sublimed sulphur, two and a half (2½) drachms; rectified alcohol, forty (40) ounces.

In the preparation of my improved medical compound, composed of the ingredients substantially as above described, the compound should be allowed to steep or stand for fourteen days, when filter, and it is ready for use.

In its use as a preventive or a therapeutic a tablespoonful two or three times a day is sufficient; and to render it agreeable to the taste it may be mixed with warm water sweetened with sugar.

The most important property of this compound or coffee-antidote is the effect which it produces on some of the phenomena of catalysis, of fermentation, and of putrefaction. It neutralizes the virus, the miasma, and other poisons which fill the atmosphere. It destroys all microscopic animalcules, is a powerful antiseptic against purulent infection, which it prevents, or putrid fermentation, which it stops. It manifests that property on the solids as well as on the humors of animal organism in the presence of air. It combines chemically with animal matters (flesh, blood, albumen, &c.) without sensibly altering their forms. It renders fluid animal liquids, blood especially. It prevents purulent infection by stopping the absorption of putrid matters, and acts directly and instantaneously, not only on the sick tissues, but on the humors themselves, combining chemically with the humors. It prevents the injurious effect of the air on the lungs, and destroys the putrid principle, as it were, on the spot.

Having thus described my invention, I shall state my claim as follows:

The coffee-antidote or medical compound, made of the ingredients or their equivalents mixed together in the proportion substantially as described, for the purpose specified.

The above specification of my invention signed by me this 25th day of October, A. D. 1871.

DR. E. DELMAR DE HAYS SAINT CYR.

Witnesses:
EDWARD ARCHER,
EDWIN W. BROWN. (98)